United States Patent
Zhang et al.

(10) Patent No.: US 9,856,961 B2
(45) Date of Patent: Jan. 2, 2018

(54) DIFFERENTIAL APPARATUS COMPONENT, DIFFERENTIAL APPARATUS THEREWITH AND MANUFACTURING METHOD THEREOF

(71) Applicant: AISIN TAKAOKA CO., LTD., Toyota-shi, Aichi (JP)

(72) Inventors: Zhong-zhi Zhang, Toyota (JP); Huaisheng Dai, Toyota (JP); Tomohiro Yamaguchi, Toyota (JP)

(73) Assignee: AISIN TAKAOKA CO., LTD., Toyota-shi, Aichi (JP)

( * ) Notice: Subject to any disclaimer, the term of this patent is extended or adjusted under 35 U.S.C. 154(b) by 0 days.

(21) Appl. No.: 15/031,202

(22) PCT Filed: Oct. 22, 2014

(86) PCT No.: PCT/IB2014/065519
§ 371 (c)(1),
(2) Date: Apr. 21, 2016

(87) PCT Pub. No.: WO2015/059641
PCT Pub. Date: Apr. 30, 2015

(65) Prior Publication Data
US 2016/0252174 A1 Sep. 1, 2016

(30) Foreign Application Priority Data
Oct. 25, 2013 (JP) ................. 2013-221809

(51) Int. Cl.
| | | |
|---|---|---|
| *F16H 48/40* | (2012.01) | |
| *C22C 38/16* | (2006.01) | |
| *C22C 38/02* | (2006.01) | |
| *C22C 38/00* | (2006.01) | |
| *C22C 38/04* | (2006.01) | |
| *C22C 38/12* | (2006.01) | |
| *C22C 38/20* | (2006.01) | |
| *C22C 38/24* | (2006.01) | |
| *F16H 48/08* | (2006.01) | |
| *F16H 48/38* | (2012.01) | |

(52) U.S. Cl.
CPC ........... *F16H 48/40* (2013.01); *C22C 38/008* (2013.01); *C22C 38/02* (2013.01); *C22C 38/04* (2013.01); *C22C 38/12* (2013.01); *C22C 38/16* (2013.01); *C22C 38/20* (2013.01); *C22C 38/24* (2013.01); *F16H 48/08* (2013.01); *F16H 2048/382* (2013.01); *F16H 2048/385* (2013.01)

(58) Field of Classification Search
CPC .... F16H 48/08; F16H 48/40; F16H 2048/382; F16H 2048/385; C22C 38/008; C22C 38/02; C22C 38/04; C22C 38/12; C22C 38/16; C22C 38/20; C22C 38/24
See application file for complete search history.

(56) References Cited

U.S. PATENT DOCUMENTS 6,146,304 A 11/2000 Bendtsen

FOREIGN PATENT DOCUMENTS

| | | |
|---|---|---|
| CN | 202883931 U | 4/2013 |
| DE | 102 44 395 A1 | 4/2004 |
| DE | 102 60 170 A1 | 7/2004 |
| EP | 1 219 865 A1 | 7/2002 |
| JP | 59-43844 A | 3/1984 |
| JP | 09176786 A * | 7/1997 |
| JP | H09176786 A | 7/1997 |
| JP | 09-229162 A | 9/1997 |
| JP | 2002-533627 A | 10/2002 |
| JP | 3842334 B2 | 11/2006 |
| JP | 2013-160290 A | 8/2013 |
| WO | WO 00/37830 A1 | 6/2000 |

OTHER PUBLICATIONS

Uno et al., English machine translation of JP 09-176786, Jul. 1997, p. 1-12.*
International Search Report (PCT/ISA/210) dated May 8, 2015, by the European Patent Office as the International Searching Authority for International Application No. PCT/IB2014/065519.
Written Opinion (PCT/ISA/237) dated May 8, 2015, by the European Patent Office as the International Searching Authority for International Application No. PCT/IB2014/065519.
Written Opinion (PCT/IPEA/408) dated Oct. 20, 2015, by the European Patent Office as the International Preliminary Examining Authority for International Application No. PCT/IB2014/065519.
Notification of Transmittal (PCT/IPEA/409, PCT/IPEA/416) dated Feb. 11, 2016, by the European Patent Office as the International Preliminary Examining Authority for International Application No. PCT/IB2014/065519.
Office Action (Notice of Ground for Rejection) dated Aug. 26, 2015, by the Japanese Patent Office in corresponding Japanese Patent Application No. 2013-221809, and an English Translation of the Office Action.
Notification of the First office Action dated Jun. 28, 2017, by the Chinese Patent Office in corresponding Chinese Patent Application No. 201480053272.5, and an English translation of the Office Action. (18 pgs).

* cited by examiner

*Primary Examiner* — Roy King
*Assistant Examiner* — Caitlin Kiechle
(74) *Attorney, Agent, or Firm* — Buchanan Ingersoll & Rooney PC

(57) ABSTRACT

In a differential apparatus component (ring gear-integrated with differential case 12), a differential case and a ring gear are formed integrally and seamlessly of cast steel. Cast Steel is preferably composed of 0.3 to 1.0% by mass of silicon (Si), 0.5 to 1.2% by mass of manganese (Mn), 0.1 to 0.5% by mass of vanadium (V), 0.01 to 0.05% by mass of tin (Sn), 0.1 to 1.5% by mass of chromium (Cr), 0.2 to 1.0% by mass of copper (Cu), and the rest composed of iron (Fe) and unavoidable impurities.

8 Claims, 2 Drawing Sheets

[Fig. 1]
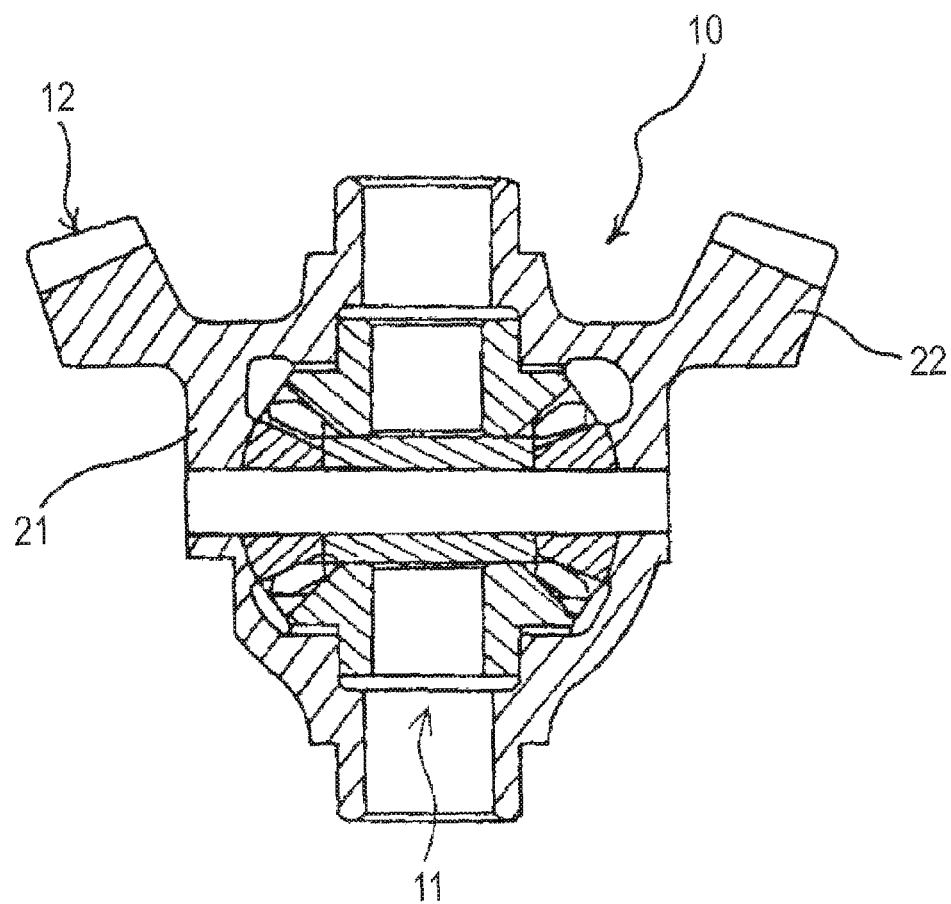

[Fig. 2]
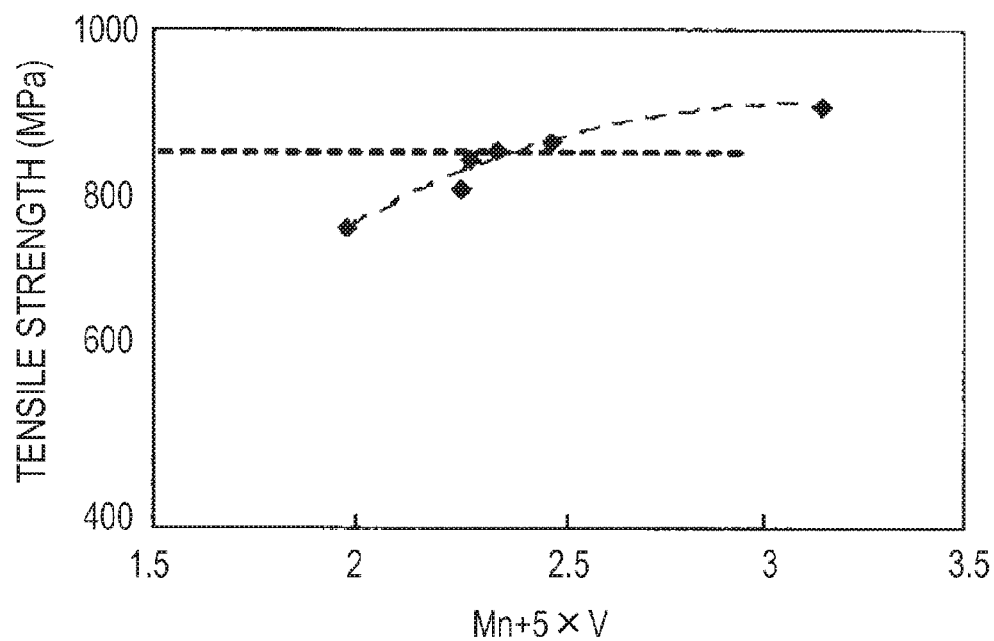
[Fig. 3]
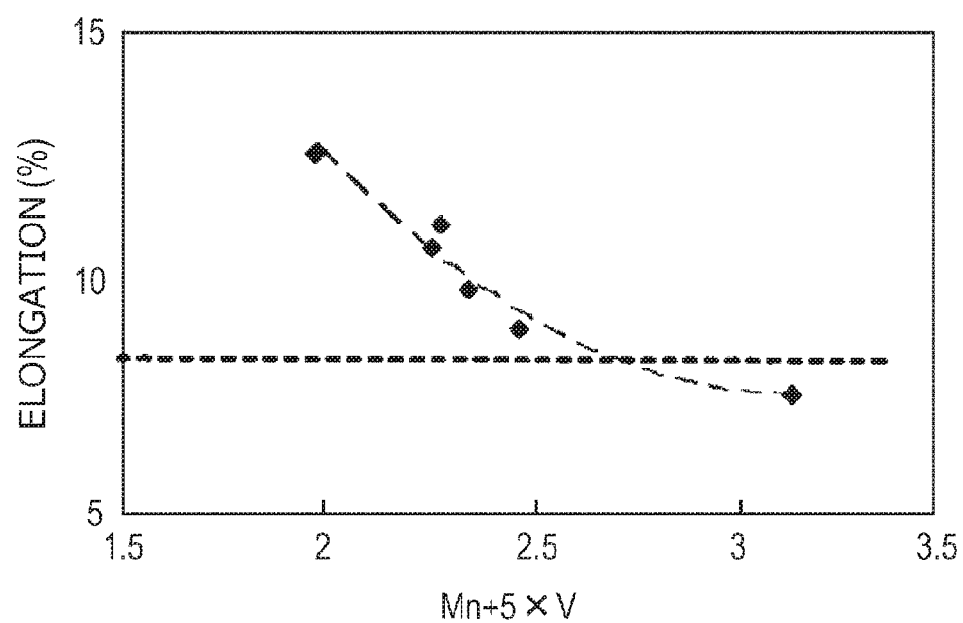

DIFFERENTIAL APPARATUS COMPONENT, DIFFERENTIAL APPARATUS THEREWITH AND MANUFACTURING METHOD THEREOF

CROSS-REFERENCE TO RELATED APPLICATION

The present application claims priority based on JP Patent Application No. 2013-221809 filed on Oct. 25, 2013, whose entire disclosure is incorporated herein by reference thereto. The present invention relates to a differential apparatus component including a differential case configured to accommodate a differential gear mechanism, and a ring gear provided so as to rotate integrally with the differential case. The present invention also relates to a differential apparatus having the differential apparatus component and a manufacturing method thereof.

BACKGROUND ART

Examples of known components of a type described above include a configuration disclosed in PTL 1. A "differential member for vehicles" disclosed in PTL 1 has a structure in which a differential case and a ring gear are integrally formed of spheroidal graphitic cast iron by casting. In this configuration, the differential case and the ring gear can be integrally formed without using fastening means such as a bolt or welding, whereby reduction of number of assembly steps and reduction in weight are achieved.

PATENT LITERATURE (PTL) 1
JP-A-59-43844

SUMMARY

The following analysis is given by the present invention. As publicly known, cast iron has low fatigue strength or the like in comparison with carburized steel or the like used normally as a ring gear material (material for a ring gear). Therefore, an integrated casting (as cast) formed of spheroidal graphitic cast iron does not have satisfactory strength properties required for the ring gear.

Therefore, in the related art described above, for chill decomposition and spheroidal pearlitization, first-stage thermal treatment is performed on the integrated casting formed of spheroidal graphitic cast iron, and then second-stage thermal treatment is performed for controlling the ratio of spheroidal pearlitization to a predetermined value to ensure workability (machinability). After the two-stage thermal treatment described above has completed, gear cutting for forming the ring gear is performed and, subsequently, surface hardening quenching (for example, high-frequency quenching), shot peening, or the like are performed on the ring gear.

In this manner, in the related art described above, the two-stage thermal treatment is required for ensuring the strength properties required for the ring gear (prior to surface hardening quenching (for example, high-frequency quenching), shot peening or the like which are performed normally on the ring gear). Even though the surface hardening quenching, shot peening, or the like is performed in addition to the two-stage thermal treatment, the strength is still significantly lower than carburized steel, therefore, easily causing problems such as chipping of the ring gear.

The invention is developed on the basis of circumstances as exemplified above. In other words, it is an object of the invention to provide a configuration which can integrate a differential case and a ring gear by casting while desirably ensuring strength properties required for being used as a ring gear.

In order to achieve the object described above, a first aspect of the invention is directed to a differential apparatus component including: a differential case configured to accommodate a differential gear mechanism; and a ring gear provided so as to rotate integrally with the differential case, wherein the differential case and the ring gear are formed integrally and seamlessly of cast steel.

A second aspect of the invention is directed to the first aspect of the invention, wherein the cast steel (typically, including 0.1 to 0.8% by mass of carbon (C)) includes 0.3 to 1.0% by mass of silicon (Si), 0.5 to 1.2% by mass of manganese (Mn), 0.1 to 0.5% by mass of vanadium (V), 0.01 to 0.05% by mass of tin (Sn), 0.1 to 1.5% by mass of chromium (Cr), 0.2 to 1.0% by mass of copper (Cu), and the rest composed of iron (Fe) and unavoidable impurities.

A third aspect of the invention is directed to the second aspect of the invention, wherein the cast steel has a composition which satisfies the following Expression (1).

$$2.3 < (Mn+5*V) < 2.7 \tag{1}$$

In Expression (1), "Mn" is % by mass of manganese (Mn), and "V" is % by mass of vanadium (V).

A forth aspect of the invention is directed to the first aspect of the invention, wherein the cast steel includes 0.1 to 0.8% by mass of carbon (C).

A fifth aspect of the invention is directed to the first aspect of the invention, wherein the differential apparatus component as cast has tensile strength of 850 MPa or above.

A sixth aspect of the invention is directed to the first aspect of the invention, wherein the differential apparatus component as cast has breaking elongation of 8% or above.

A seventh aspect of the invention is directed to the first aspect of the invention, wherein the differential apparatus component as cast has fatigue strength of 400 MPa or above.

An eighth aspect of the invention is directed to a differential apparatus including the differential apparatus component according to the first aspect.

A ninth aspect of the invention is directed to a manufacturing method of a differential apparatus component, comprising: casting cast steel to form an integral and seamless casting for a differential apparatus component including a ring gear integrated with differential case.

According to the differential apparatus component of the first aspect of the invention, the differential case and the ring gear are formed integrally and seamlessly of cast steel. Here, the ring gear formed of cast steel in the differential apparatus component described above is higher in strength properties (tensile strength and fatigue strength) than the ring gear formed of spheroidal graphitic cast iron of the related art described above. Therefore, the strength properties required for the ring gear are sufficiently obtained without performing two-stage thermal treatment which is required in the related art described above. The ring gear formed of cast steel in the differential apparatus component is not easily subject to chipping because the amount of carbon is smaller than that of the ring gear formed of spheroidal graphitic cast iron of the related art described above.

According to the differential apparatus component of the second aspect of the invention, the differential case and the ring gear are integrally and seamlessly formed of cast steel containing 0.3 to 1.0% by mass of silicon (Si), 0.5 to 1.2% by mass of manganese (Mn), 0.1 to 0.5% by mass of vanadium (V), 0.01 to 0.05% by mass of tin (Sn), 0.1 to 1.5% by mass of chromium (Cr), 0.2 to 1.0% by mass of copper (Cu), and the rest composed of iron (Fe) and unavoidable impurities. Therefore, with the invention according to the second aspect, an extremely desirable productivity (casting properties and machinability after casting) and the strength properties are realized when the differential case and the ring gear are integrally casted.

According to the differential apparatus component of the third aspect of the invention, the differential case and the ring gear are formed integrally and seamlessly of cast steel having a composition which satisfies the composition conditions described above and also satisfies the above-described Expression (1). Therefore, with the invention according to the third aspect, extremely desirable mechanical properties (specifically, tensile strength and elongation (ductility)) are realized when the differential case and the ring gear are integrated by casting.

In this manner, according to the aspects of the invention, it is possible to provide a configuration which can integrate a differential case and a ring gear by casting while desirably ensuring strength properties required for being used as a ring gear.

BRIEF DESCRIPTION OF DRAWINGS

FIG. 1 is a cross-sectional view illustrating a schematic configuration of a differential apparatus provided with a differential apparatus component of an embodiment of the invention.

FIG. 2 is a graph for researching an influence of contents of manganese and vanadium in cast steel which constitutes the differential apparatus component (the ring gear-integrated with differential case) illustrated in FIG. 1.

FIG. 3 is a graph for researching an influence of contents of manganese and vanadium in cast steel which constitutes the differential apparatus component (the ring gear-integrated with differential case) illustrated in FIG. 1.

PREFERRED MODES

With reference to the drawings, an embodiment of the invention will be described below. Modifications are summarized at the end of the description because understanding of the coherent description of the embodiment is impaired if inserted in the description of the embodiment.
<Configuration>

Referring to FIG. 1, a differential apparatus 10 includes a differential gear mechanism 11 and a ring gear-integrated with differential case 12. Since the differential gear mechanism 11 is known, detailed description thereof will be omitted.

The ring gear-integrated with differential case 12 which corresponds to the "differential apparatus component" of the invention includes a differential case 21 configured to accommodate the differential gear mechanism 11, and a ring gear 22 provided so as to rotate integrally with the differential case 21.

Here, in the ring gear-integrated with differential case 12 of the embodiment, the differential case 21 and the ring gear are formed integrally and seamlessly of cast steel. Specifically, in the embodiment, the ring gear-integrated with differential case 12 is integrally formed by casting using cast steel having the following composition.

Composition of Cast Steel includes: 0.1 to 0.8% by mass of carbon (C), 0.3 to 1.0% by mass of silicon (Si), 0.5 to 1.2% by mass of manganese (Mn), 0.1 to 0.5% by mass of vanadium (V), 0.01 to 0.05% by mass of tin (Sn), 0.1 to 1.5% by mass of chromium (Cr), 0.2 to 1.0% by mass of copper (Cu), and the rest composed of iron (Fe) and unavoidable impurities.
<Outline of Manufacturing Method>

Subsequently, an outline of a method of manufacturing the ring gear-integrated with differential case 12 of the embodiment will be described. First of all, a casting as a base material of the ring gear-integrated with differential case 12 is manufactured of the cast steel having the composition described above by casting.

Subsequently, normal thermal treatment (for decomposition of segregated and coarse structures or alleviation of internal stress), that is to say, thermal refining on castings formed of cast steel, is performed on this cast. This thermal treatment is performed by holding the casting in a temperature range of 700 to 950 degrees C. for 1 to 3 hours, and then cooling the casting by air cooling or furnace cooling. By means of this thermal treatment, strength properties required for the ring gear 22 are secured.

The casting after the thermal treatment is machined to a shape corresponding to the ring gear-integrated with differential case 12 by cutting or the like. Subsequently, surface hardening treatment such as carburizing, shot peening, and surface hardening quenching is performed on a portion corresponding to the ring gear 22. Finally, final processing such as polishing or the like is performed, whereby the ring-gear integrated with differential case 12 is completed.

In the embodiment, since the composition of the cast steel is as described above, an extremely desirable productivity (castability and machinability after casting) and strength properties are achieved. Detail description will be given below.

To be more precise, for example, carbon has an effect of improvement in strength and castability (fluidity of a molten metal at the time of casting). Therefore, if the content is below the range described above, the effect of improvement of casting properties by carbon cannot be obtained sufficiently. In contrast, if the content exceeds the above-described range, lowering of toughness and machinability in association with an increase in amount of pearlite may result.

If the content of silicon is below the range described above, lowering of strength in association with lowering in amount of solid solution of silicon may result. In contrast, if the content exceeds the above-described range, lowering of toughness and machinability in association with an increase in amount of segregation as a non-metallic inclusion may result.

Manganese is an element which accelerates pearlitization and, if the content is below the range described above, lowering of strength may result. In contrast, if the content exceeds the above-described range, lowering of toughness and embrittlement at the time of thermal treatment may result.

Vanadium has an effect of improvement in strength on the basis of precipitation hardening. Therefore, if the content is below the range described above, the effect of improvement of tensile strength may not be obtained sufficiently. In contrast, if the content exceeds the above-described range, lowering of toughness may result.

If the content of tin is below the range described above, the effect of improvement of tensile strength may not be obtained sufficiently. In contrast, if the content exceeds the above-described range, lowering of toughness may result.

Chromium has an effect of improvement in strength on the basis of generation of carbide. Therefore, if the content is below the range described above, the effect of improvement of tensile strength may not be obtained sufficiently. In contrast, if the content exceeds the above-described range, lowering of toughness may result.

If the content of copper is below the range described above, the effect of improvement of tensile strength may not be obtained sufficiently. In contrast, if the content exceeds the above-described range, lowering of machinability and toughness may result.

Therefore, by determining the contents of the respective elements from the above-described range, a remarkable effect, namely, superior productivity due to significantly desirable castability and machinability after casting, in addition to desirable strength properties are obtained in the ring gear-integrated with differential case 12 formed integrally and seamlessly of cast steel by casting.

In particular, regarding manganese and vanadium, it is preferable to be contained so as to satisfy the following expression (1). Accordingly, extremely desirable mechanical properties (tensile strength and elongation) are achieved.

$$2.3<(Mn+5*V)<2.7 \quad (1)$$

In Expression (1), "Mn" is % by mass of manganese (Mn), and "V" is % by mass of vanadium (V).

<Advantageous Effects>

Subsequently, advantageous effects which are obtained by the configuration of the embodiment will be described while comparing a specific example and comparative examples.

Table 1 shows a result of evaluation of tensile strength, elongation, and fatigue strength. In the table, Example is cast steel having the following composition: 0.48% by mass of carbon (C), 0.42% by mass of silicon (Si), 1.00% by mass of manganese (Mn), 0.27% by mass of vanadium (V), 0.02% by mass of tin (Sn), 0.38% by mass of chromium (Cr), 0.35% by mass of copper (Cu), 0.02% by mass of phosphorous (P), 0.01% by mass of sulfur (S), and the rest being composed of iron (Fe) and unavoidable impurities.

Among comparative examples, "FCD450", "FCD600" (FCD indicates spheroidal graphitic cast iron), and "S50C" are materials used for the differential case in a configuration in which the differential case and the ring gear are formed separately and then are joined by tightening (with a bolt) or welding, and "SCM420" (SCM indicates chromium molybdenum steel) is a material used for the ring gear. The "S50C"-comparative example is a material after nitriding and the "SCM420"-comparative example is a material after carburizing.

The tensile strength and the elongation were evaluated in the following manner. First of all, a molten metal prepared to have a predetermined composition was poured in a sand mold(s) having a 1 inch-Y block cavity, then was solidified and cooled, and then a material to be tested having a 1 inch block shape was taken out from the sand mold(s). From the material to be tested, JIS 4 type test piece (D=14 mm, R=15 mm, L (gauge length)=50 mm, P (parallel portion)=60 mm) was obtained by cutting out. With this test piece, a test was conducted according to Metallic Materials Tensile Testing Method (JIS Z 2201-1980) with a precise universal tester "Autograph" (registered trademark) manufactured by Shimadzu Corporation, and the tensile strength (maximum stress) and the elongation (breaking elongation) are obtained from a stress-strain diagram. It should be noted that tensile strength and elongation are parameters for evaluating mechanical strengths of a differential case portion (possibility of weight reduction by thin wall casting or the like process is considered based on those parameters). SCM420 is a material for ring gear, therefore, tests for evaluating tensile strength and elongation of SCM420 are omitted.

The fatigue strength was evaluated in the following manner. First of all, from the material to be tested described above, JIS 1 type test piece (d=8 mm, R=24 mm, L (parallel portion)=16 mm) was obtained by cutting out. With this test piece, a test according to rotary bending fatigue testing method (JIS Z 2274) was conducted to obtain a fatigue strength of the test piece (repeated stress in $10^7$ repeated cycles).

TABLE 1

| | | Tensile Strength (MPa) | Elongation (%) | Fatigue Strength (MPa) |
|---|---|---|---|---|
| Example | cast steel | 900 | 9.6 | 400 |
| Comparative Examples | FCD450 | 450 | 10.0 | 250 |
| | FCD600 | 600 | 3.0 | 305 |
| | S50C | 608 | 15.0 | 312 |
| | SCM420 | — | — | 350 |

As is clear from the result of evaluation shown in Table 1, according to this example, higher tensile strength was obtained in comparison with the tensile strengths of the differential cases of the comparative examples. According to this example, a higher fatigue strength thereof (of this sample) was obtained in comparison with the respective comparative examples. In this example, specifically, despite that carburizing is not performed yet, the fatigue strength thereof was higher than that of the ring gear material of the related art after carburizing. As regards the elongation in this example as well, values of this sample better than those of FCD600 were obtained, and values thereof equivalent to those of FCD450 were obtained although the value thereof was not as good as those of S50C. In other words, in this example, high tensile strength and fatigue strength as well as good elongation properties (ductility) are achieved unlike the comparative examples. Therefore, according to this example, the strength properties required for the ring gear 22 are desirably secured, and weight reduction of the differential case 21 can be achieved by thin wall casting or the like process.

Table 2 shows experimental data for evaluating influences of contents of manganese and vanadium on the tensile strength and the elongation. FIG. 2 and FIG. 3 are graphs of experimental data in Table 2. The "alloy coefficient" in the Table is a calculated value of a middle member (Mn+5*V) in the above described Expression (1). Broken horizontal lines in FIG. 2 and FIG. 3 show target values of the tensile strength and the elongation: the former is 850 MPa or higher; and the latter is 8% or higher.

TABLE 2

| Mn (% by mass) | V (% by mass) | Alloy Coefficient | Tensile Strength (MPa) | Elongation (%) |
|---|---|---|---|---|
| 0.50 | 0.30 | 1.97 | 760 | 12.5 |
| 0.85 | 0.29 | 2.28 | 842 | 11.0 |
| 0.66 | 0.32 | 2.26 | 806 | 10.5 |
| 1.00 | 0.27 | 2.35 | 852 | 9.6 |
| 0.70 | 0.49 | 3.15 | 908 | 7.5 |
| 0.88 | 0.32 | 2.48 | 865 | 8.8 |

As is clear from the results of evaluation in FIG. 2 and FIG. 3, the target values of the tensile strength and the elongation as described above are achieved by adjusting the composition of cast steel so as to satisfy the above-described Expression (1), and extremely desirable mechanical properties (specifically, tensile strength and elongation) are achieved.

<Modifications>

Some representative modifications will be described below. In the description of the modifications given below, the same reference numerals as those in the embodiment described above may be used for portions having the same configuration and functions as those described in the embodiment given above. For the description of the corresponding portion, the description of the above-described embodiment may be quoted as needed within a technically consistent range. Needless to say, the modifications are not limited to those listed below. Part of the above-described embodiment and all or part of a plurality of the modifications may be applied in combination as needed within a technically consistent range.

The invention is not limited to the above-described specific apparatus configuration. In other words, the structures or the shapes of the differential gear mechanism 11 and the ring gear-integrated with differential case 12 are not limited to the specific modes illustrated in FIG. 1.

The composition of the specific cast steel in the above-described example is illustration only, and the above-described extremely desirable properties are obtained by the contents of the respective elements included within the above-described range.

The disclosures of the above indicated Patent Literatures are to be incorporated herein by reference. The particular exemplary embodiments or examples may be modified or adjusted within the gamut of the entire disclosure of the present invention, inclusive of claims, based on the fundamental technical concept of the invention. Moreover, a variety of combinations or selection of elements herein disclosed, inclusive of various elements of the disclosure, exemplary embodiments, examples or figures, may be made within the concept of the entire disclosure. It is to be understood that the present invention is to include a variety of changes or modifications that may occur to those skilled in the art in accordance with the entire disclosures inclusive of the claims and the technical concept of the invention. Inter alia, if the ranges of numerical values are indicated herein, they should be construed as indicating any arbitrary numerical values or sub-ranges comprised within such ranges even if such effect is not stated explicitly.

It should be noted that symbols for having reference to the drawings, as used in the present application, are exclusively for assisting in understanding and are not intended to restrict the invention to the mode(s) illustrated.

REFERENCE SIGNS LIST

10 . . . differential apparatus, 11 . . . differential gear mechanism, 12 . . . ring gear-integrated with differential case (differential apparatus component), 21 . . . differential case, 22 . . . ring gear

The invention claimed is:

1. A differential apparatus component, comprising:
a differential case configured to accommodate a differential gear mechanism;
a ring gear provided so as to rotate integrally with the differential case; and
the differential case and the ring gear being formed integrally and seamlessly of cast steel, the cast steel including 0.3 to 1.0% by mass of silicon (Si), 0.5 to 1.2% by mass of manganese (Mn), 0.1 to 0.5% by mass of vanadium (V), 0.01 to 0.05% by mass of tin (Sn), 0.1 to 1.5% by mass of chromium (Cr), more than 0.20% by mass and 1.0% by mass or less of copper (Cu), and the rest composed of iron (Fe) and unavoidable impurities.

2. The differential apparatus component according to claim 1, wherein the cast steel has a composition which satisfies the following expression (1):

$$2.3 < (Mn + 5 * V) < 2.7 \quad \ldots (1)$$

where "Mn" is % by mass of manganese (Mn), and "V" is % by mass of vanadium (V).

3. The differential apparatus component according to claim 1, wherein the cast steel includes 0.1 to 0.8% by mass of carbon (C).

4. The differential apparatus component according to claim 1, wherein the differential apparatus component as cast has tensile strength of 850 MPa or above.

5. The differential apparatus component according to claim 1, wherein the differential apparatus component as cast has breaking elongation of 8% or above.

6. The differential apparatus component according to claim 1, wherein the differential apparatus component as cast has fatigue strength of 400 MPa or above.

7. A differential apparatus including the differential apparatus component according to claim 1.

8. A manufacturing method of a differential apparatus component comprising:
casting cast steel to form an integral and seamless casting for a differential apparatus component including a ring gear integrated with differential case; and
the cast steel including 0.3 to 1.0% by mass of silicon (Si), 0.5 to 1.2% by mass of manganese (Mn), 0.1 to 0.5% by mass of vanadium (V), 0.01 to 0.05% by mass of tin (Sn), 0.1 to 1.5% by mass of chromium (Cr), more than 0.20% by mass and 1.0% by mass or less of copper (Cu), and the rest composed of iron (Fe) and unavoidable impurities.

* * * * *